May 8, 1934.     H. H. DREYFUSS     1,957,947
MOTION PICTURE AUDITORIUM
Filed Sept. 18, 1931     5 Sheets-Sheet 1

INVENTOR
Henry H. Dreyfuss
BY
Austin & Dix
ATTORNEYS

May 8, 1934.　　　H. H. DREYFUSS　　　1,957,947
MOTION PICTURE AUDITORIUM
Filed Sept. 18, 1931　　　5 Sheets-Sheet 2

INVENTOR
Henry H. Dreyfuss
BY his ATTORNEYS
Austin & Dix

May 8, 1934. H. H. DREYFUSS 1,957,947
MOTION PICTURE AUDITORIUM
Filed Sept. 18, 1931 5 Sheets-Sheet 4

INVENTOR
*Henry H. Dreyfuss*
BY his ATTORNEYS
*Austin & Dix*

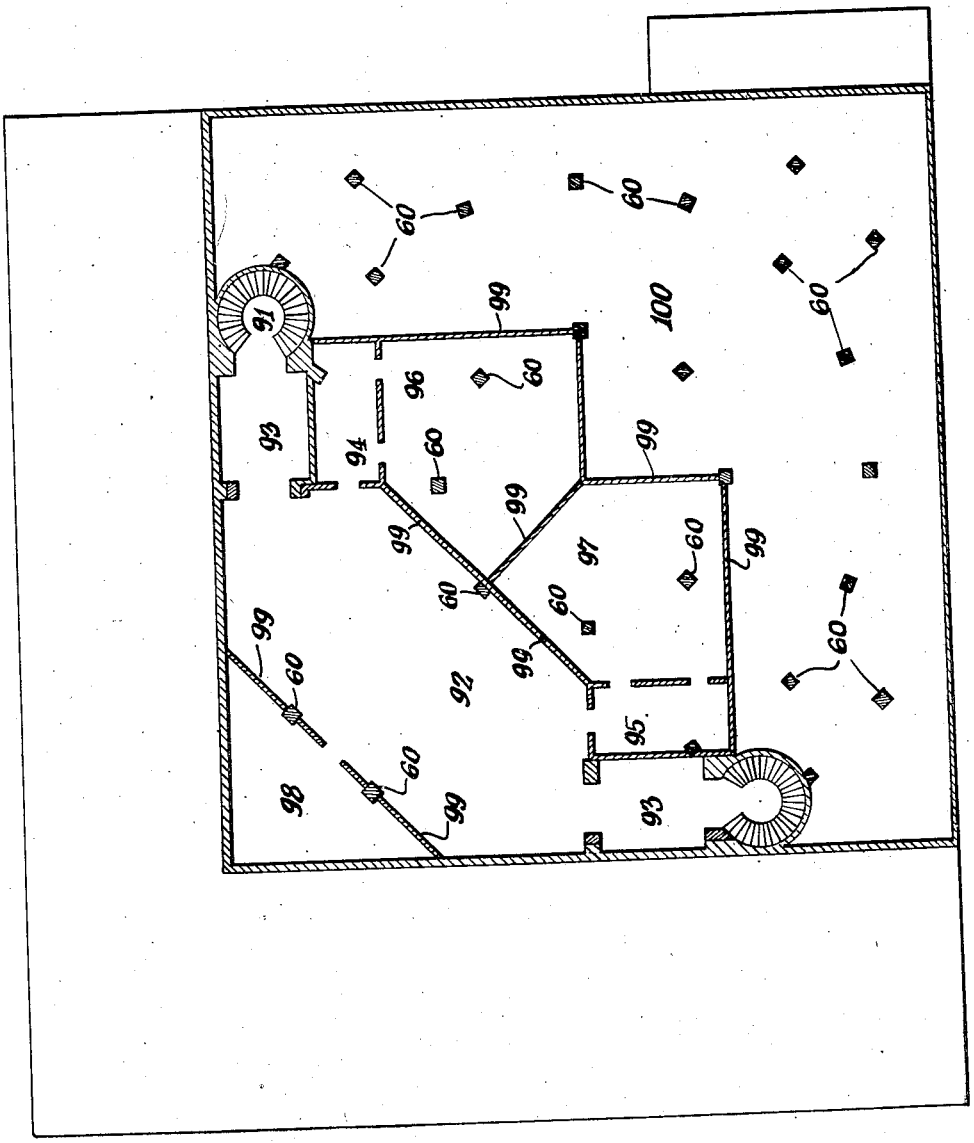

Patented May 8, 1934

1,957,947

UNITED STATES PATENT OFFICE 1,957,947

MOTION PICTURE AUDITORIUM

Henry H. Dreyfuss, New York, N. Y.

Application September 18, 1931, Serial No. 563,497

7 Claims. (Cl. 20—1.12)

This invention relates to improvements in building constructions, and more particularly to an improved building including an auditorium especially adapted for the projection of sound and color motion picture films.

The present-day tremendous motion picture auditoriums present several important difficulties due to their relatively enormous size. In the first place, owing to the fact that the sound, as projected, has to reach a person in a seat farthest away from the screen, it is amplified to such proportions that the spectator sitting in close proximity to the stage is substantially deafened and his enjoyment of the sound reproduction thereby seriously impaired, if not destroyed. In the same manner, and for the same reason, when an image is thrown upon a screen large enough for a person seated in one of the rear rows to distinguish clearly, such picture is made ludicrous and disproportionate for those members of the audience seated in close proximity to the screen. In addition, large auditoria, due to their great size, impose considerable inconvenience upon the attending public. A person entering a large, modern picture theatre is first required to traverse a series of large lobbies, and then to walk a great distance inside the auditorium, in unaccustomed darkness, to find his seat. Upon leaving or exiting, the same difficulties are again presented to the spectator. Such large show houses, because of the necessity of eliminating supporting members, such as columns, from the body of the auditorium, require very heavy beam and truss work. In addition, where under new building laws of several States permission is being granted to superimpose commercial structures on top of such theatres, the absence of supporting columns in the auditorium, proper, will necessitate still heavier, and correspondingly more expensive construction.

A further marked disadvantage of the present-day large-sized auditoria, resides in the excessive cost required for the installation and upkeep of lighting fixtures.

It is an object of this invention to provide an improved theatre particularly adapted for sound and vision, which is characterized by a maximum of screen intimacy, while at the same time retaining a desirably large seating capacity.

It is a further object of this invention to provide such an improved theatre in which a plurality of screens are centrally disposed in an auditorium.

Yet another object of this invention is the provision of an improved projection system for sound and vision in which an audience may be grouped around a plurality of projection screens serviced by a single or common projection unit.

Another object of this invention is the provision of an improved theatre construction which permits of ready ingress and egress of spectators to any desired portion of the auditorium.

A further object of this invention is the provision of an improved theatre structure for sound and vision in which the screen supports and associated structures are also adapted to serve as supports for superimposed building constructions.

It is also an object of this invention to provide an improved motion picture theatre for sound and vision, in which maximum seating capacity is insured in a given ground space.

Another object of this invention is the provision of an improved method and apparatus for visually and aurally presenting information, such as stock reports, displays and like features.

Another object of this invention is the provision of an improved lighting system for auditoria for sound and vision projection in which the reflecting curtains are adapted to be placed in front of screen surfaces and such curtains are adapted to be incorporated in or included as elements of the lighting system.

These, and other desirable objects and advantages of the present invention will be described in the accompanying specification and illustrated in the drawings, a certain preferred embodiment being disclosed by way of example only, for, since the underlying principles may be incorporated in other specific constructions, it is not intended to be limited to the ones here shown, except as such limitations are clearly imposed by the appended claims.

In the drawings, like numerals refer to similar parts throughout the several views, of which Fig. 1 is a perspective view of an improved auditorium having centrally disposed viewing surfaces or screens;

Fig. 5 is a plan view of the basement structure of the improved auditorium.

Figure 1:
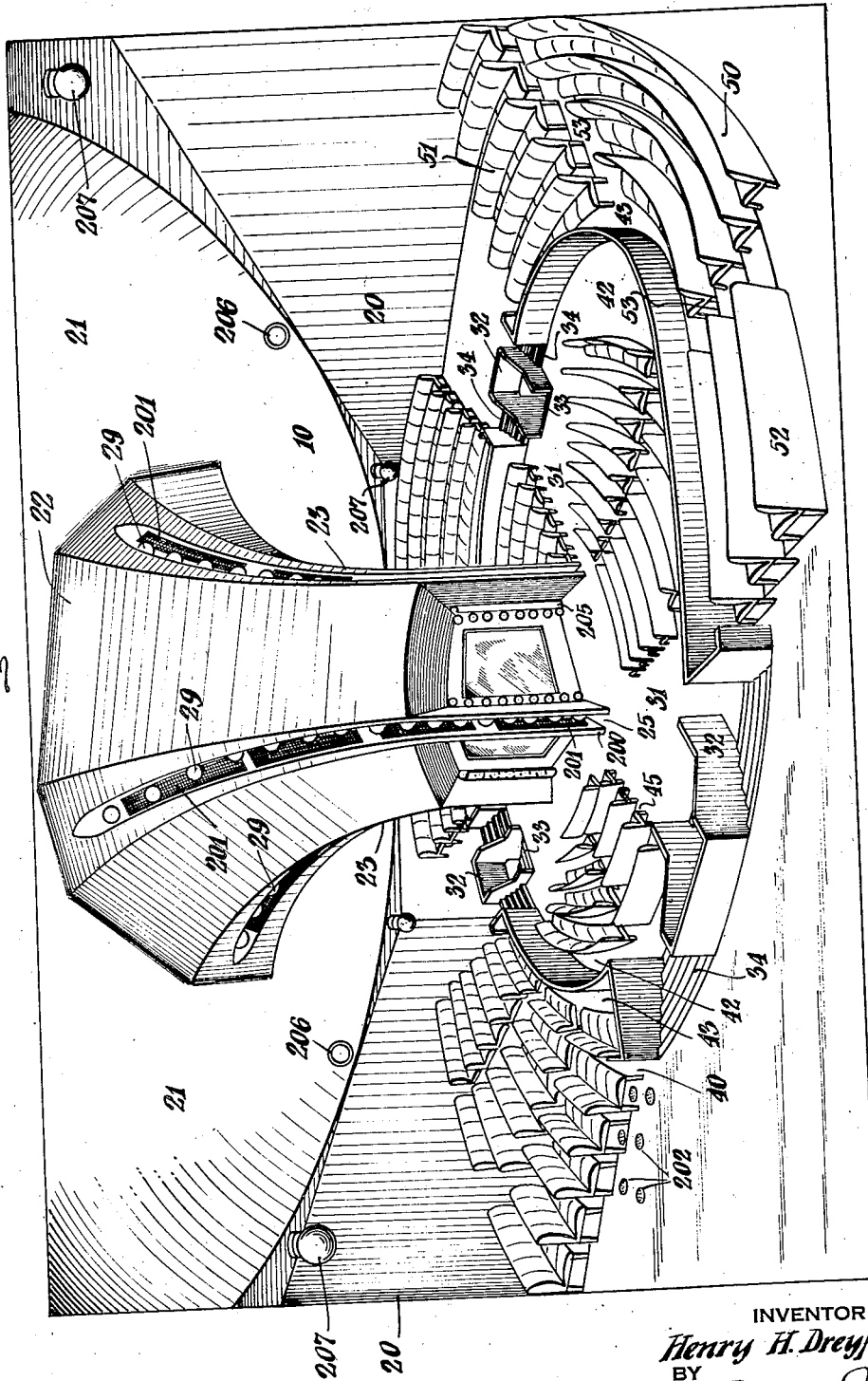

Referring more particularly to the drawings, and to the construction shown in Fig. 1, the novel motion picture auditorium of the present invention includes a substantially square room designated generally by the numeral 10. This room or chamber may have any desired circular or polygonal shape and is provided with the usual walls 20, suitably configured, and a vaulted ceiling designated by the numeral 21. The vaulted ceiling is centrally supported by a columnar structure 22 having a plurality of apertures 23, at the bottom thereof, and facing various portions of the auditorium so as to provide a substantially continuous series of apertures adapted to contain a plurality of viewing screens 24 for sound and vision projection. The screen apertures are separated from each other by columns 25 having diverging fins, 200, projecting outwardly from the main columnar structure and serving to prevent interference between adjacent screens under normal operating conditions.

The central columnar structure 22 extends through the floor 30, and through the basement and is supported on the usual footings. This separate support of the central column prevents the transmission of vibrations from the main area of the auditorium to the supports of the viewing screens. The floor is provided with a plurality of main aisles or ramps 31 extending upwardly from the sections 25 of the center support to a series of staircases 32 having stairways 33 leading upwardly from the foyer and other stairs 34 disposed on either side thereof leading to the upper or mezzanine section of the auditorium.

The main aisles 31 may be illuminated, during the projection of the pictures, by means of lights 29 positioned between the fins 200 of columns 25 and so disposed as not to interfere with the projection screens 24. The lighting fixtures 29, are preferably disposed in the rear portion or apex of the recess formed by the fins and may, if desired, be continuous from floor to ceiling, as shown more particularly in Fig. 1. These lights may be so-called naked lights, or they may comprise illuminated glass panels. By placing these lights deep in the fins, splash of light into the auditorium will be eliminated and the illumination will be confined to the aisle areas. In addition, the fins 200, of the columns 25, may be provided on their inner surfaces with ventilating devices, designated generally by the numeral 201, to permit the introduction of fresh air, cooled or otherwise tempered, into the auditorium at a substantially central point, the grills or other devices 201 preferably being so constituted and arranged as to direct the inflowing air upwardly toward the ceiling, from whence it flows toward the walls of the chamber or auditorium. The air may be withdrawn through suitable conduits positioned under the seats, these conduits having caps or other devices, 202, adapted to prevent the clogging of the conduits. By positioning the withdrawal conduits in a uniform manner over the entire auditorium, there will be secured a uniform distribution of cooling and refreshing air to the several portions of the audience without requiring any one portion thereof to breathe a vitiated atmosphere. While the air inlets in the auditorium may be positioned in the fins, it will be appreciated that they may be disposed directly above the viewing screens, if desired.

The main area of the auditorium is divided into a plurality of segments 40, having central aisles or ramps 41 debouching from the main aisle 42 extending around the upper portion of the main body of the auditorium. The upper tiers of seats are contained in sections 50, 51 and 52, extending upwardly from an aisle 43, which is reached by means of the stairs 34. Ramps and steps 53 are provided between the several sections to permit access to the seats, and also to provide access to the rear aisle 54 co-extensive with the walls 20. It will be apparent that by spacing the stairways 32 equally distant from each other and in substantial alignment with the supporting or spacing columns 25 that the auditorium can be divided into a plurality of sections or segments, each of which is relatively small and permits of a desired degree of intimacy between the spectators and the screen 24. Thus a person sitting in the rearmost portion of any of the sections 50 will be within easy aural and visual range of the screen immediately facing him. This will permit of a desirable modulation or modification of the sound and light propagated or emitted out from the screen so that the persons seated in the foremost sections 45 of the seats adjacent the screen will not be subjected to excessive ocular or aural discomfort.

The screens 24 are preferably of a translucent material adapted for the projection of sound therethrough from the central chamber 26 of the column which is formed by the rear walls of the screens and adjacent supporting members 25. In this chamber 26 may be disposed any suitable projection apparatus including, where desired, suitable prismatic or equivalent optical devices adapted to feed or throw a single picture upon each of the screens, the said chamber 26 being connected with a projection room 27 through an aperture 28 adapted to permit the passage of suitable translating apparatus for the projected picture. In addition the chamber or space 26 will serve to house the sound projection equipment which may include separate units for each of the screens, or a common, centrally disposed unit for the entire group, the circumferential disposition of the screens being particularly adapted for the use of a unitary sound source of sufficient strength to be heard in the various portions of the auditorium.

Where separate sound units are used for each screen the whole assembly may be connected in parallel, each set being provided with its own amplifier system, thus enabling the accurate monitoring of the sound with respect to each section of the auditorium. Thus it will be appreciated that for each given section sound of sufficient strength to be heard with comfort by all persons viewing the particular screen, will be relatively weak in comparison with such a sound as required for use with a single screen for an auditorium having the total seating capacity of the auditorium herein described.

While the projection room has been disclosed as positioned above the chamber 26, it will be appreciated that it can be placed below or in the said chamber, without departing from the spirit and scope of the present invention.

To comply with the requirements of various building codes, rolling automatic fire doors 203 may be placed in back of the viewing screens.

In the auditorium as herein disclosed, the maximum distance from the screen to the farthest seat of any section 50 is 70 feet, while the total of these distances is 280 feet. Thus the present construction permits the utilization of a building space of substantially 150 feet diagonally, to give an effective seating of the equivalent of an auditorium 280 feet in depth from the screen to the rear seats. All of this is accomplished without requiring the use of excessive illumination and sound to the resulting discomfort of the spectators nearest the stage. The effective result of the improvements of the present invention is to provide a medium of sound and visual projection with accompanying comfort in aural and visual reception.

In the construction as here shown, a single floor is so arranged as to comfortably seat substantially 1700 people, yet a balcony could be added containing approximately 750 seats, which would give a total seating capacity of substantially 2500 seats, which capacity could obviously not be equalled by a regulation theatre on a plot corresponding in size. The seating capacity, expressed in square feet per head, may, for purposes of illustration, be assumed to be approximately 5,89. In the average auditorium this space requirement is exceeded, being substantially 7.5 sq. ft. per head. This shows a space saving of 1.61 sq. ft. per person, which is equivalent to saying that for every 4 people seated in an ordinary auditorium it will be possible to seat at least 5 in an auditorium constructed according to the principles of the present invention.

While the fins 200 of the central supporting columnar structure may be of any desired extent it will be appreciated that they may be suitably configured and extended substantially the entire length of the ramps or walkways 31, so as to effectually separate the various sections 40 from each other and thus provide a plurality of theatres within a common auditorium. Thus, it is within the concept of the present invention to present a series of separate pictures on each of the several screens, which would permit the continuous presentation of such pictures and allow a spectator to wander from one screen to another and see any given picture and to view a program in any desired order or sequence. In addition, the segmental construction of the auditorium will permit the closing off of various sections during the hours of the day in which the attendance is poor, and to progressively open up the sections to the public as the attendance increases, particularly in the late afternoon and evening hours. Such flexibility in presentation of a program and in the seating of an audience is a distinct and unique feature of the present invention. Owing to the relatively short distance between sections and the convenient inlets and outlets to the sections, no undue hardship is imposed upon the spectators.

By virtue of the curvilinear roof construction and separating walls or buttresses 200, the sounds may be effectively concentrated within the particular segment or area served by a particular screen, and interference with adjacent sections substantially completely avoided. The requisite directive effect will, of course, be separately figured for each particular construction.

Figure 2:
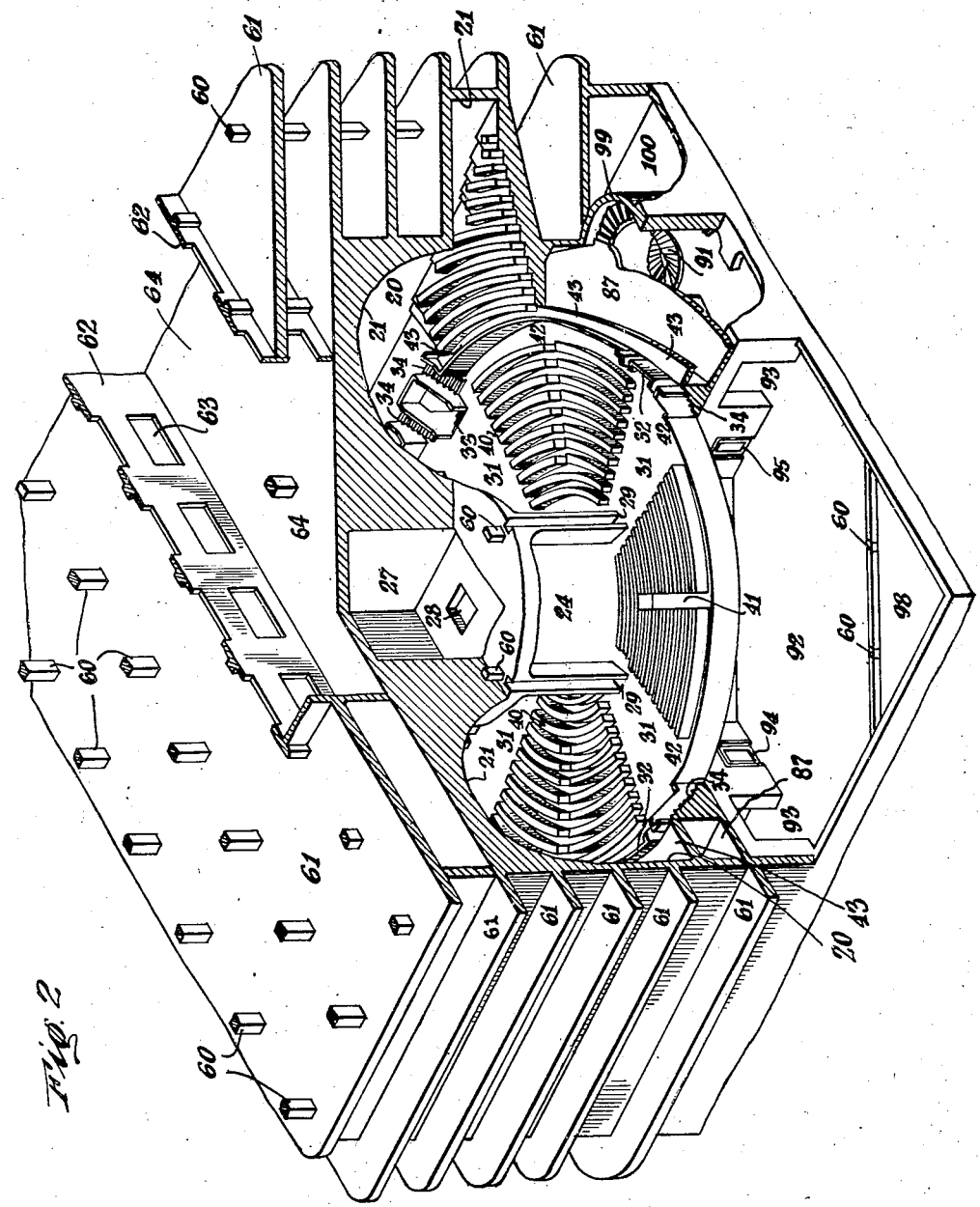
Fig. 2 is an isometric elevation of an improved auditorium incorporated in a building structure, certain of the building elements being shown in section.
Figure 3:
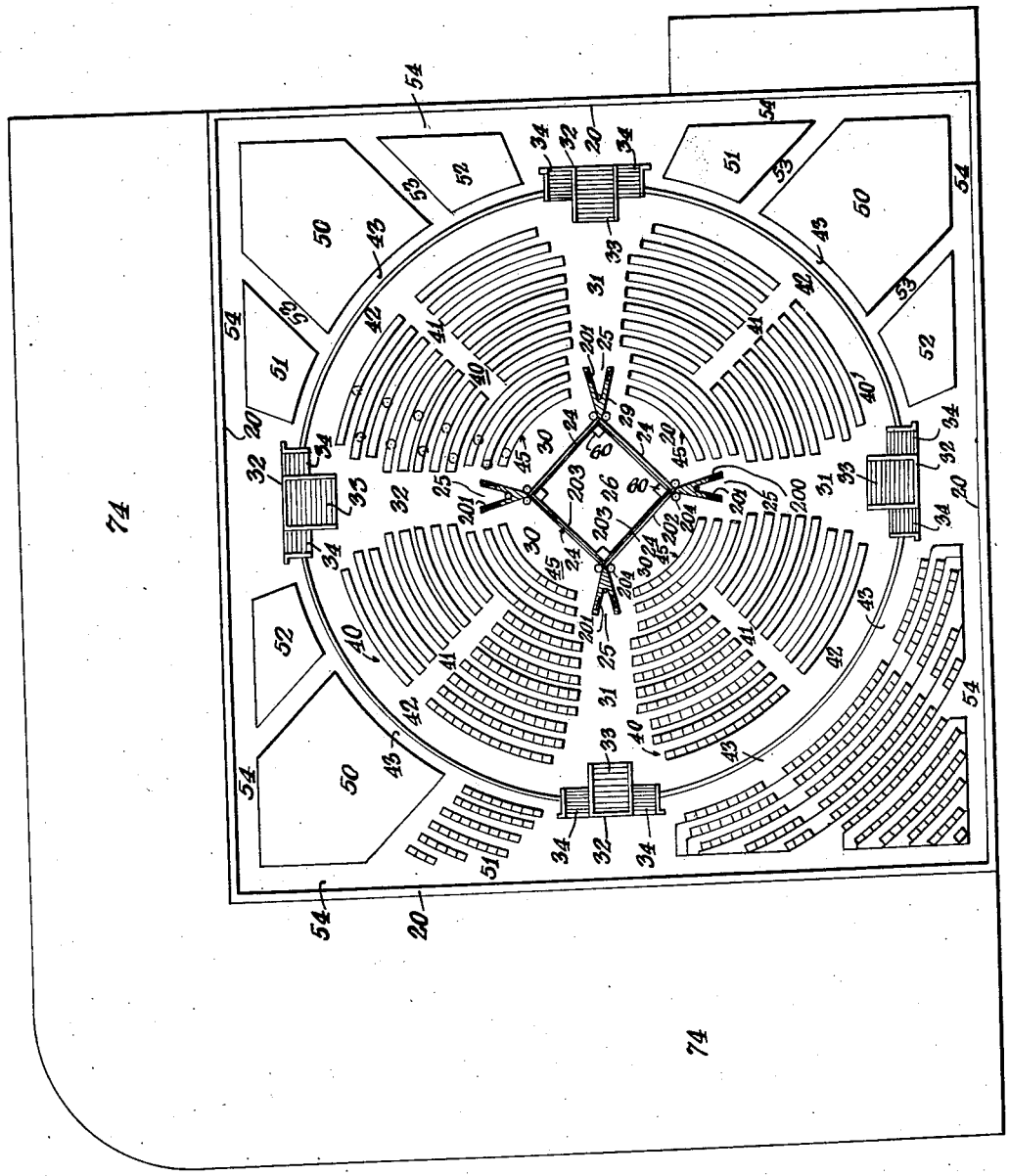
Fig. 3 is a plan view of an improved auditorium showing general seating arrangement and disposition of the projection screens centrally thereof.

The present novel theatre construction is particularly adapted for insertion or incorporation in existing buildings or new structures, as will readily be appreciated from a consideration of the details shown in Fig. 2, in which the improved construction is shown incorporated in a building in which it utilizes the major portion of four stories and the basement. It is to be particularly noted that the supporting columns 60, of the building, may be disposed substantially uniformly over the entire area of the building, thus providing a uniform support for the entire structure.

Owing to the arched ceiling construction of the auditorium and the overhead support provided by the central column 22 and its component parts, the walls, girders and associated lateral and vertical supports of the auditorium need not be of extra heavy construction, as is at present required for the usual type of auditorium in which the entire roof structure must be supported directly from the side walls. The several floors of the building are designated generally by the numeral 61. The building may be built up to any desired height and provided with the usual walls 62, and any desired number of windows and other openings 63. The upper stories of the building may be recessed, as indicated at 64, to form bays in order to provide the maximum of light for these stories, at the same time permitting the use of the lowermost stories, and particularly the central part thereof, for a theatre, which, as is well known, does not require daylight illumination.

Figure 4:
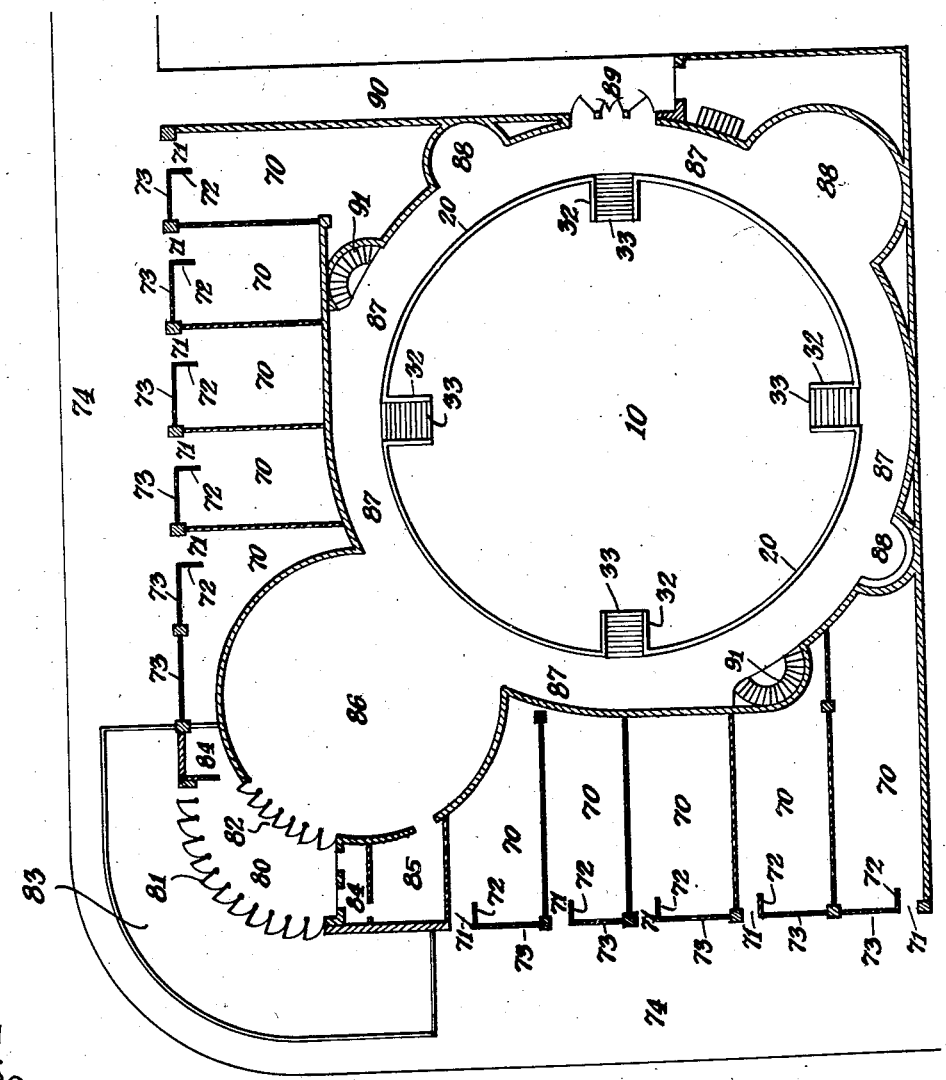
Fig. 4 is the ground floor plan of an improved motion picture auditorium and associated building elements.

As above noted, and as particularly shown in Fig. 4, the exterior of the ground floor of the building, as well as the upper floors, may be used for a plurality of offices or shops, designated generally by the numerals 70, the shops shown in Fig. 4 being provided with doorways 71 and doors 72. These shops will, of course, be provided with the usual windows, designated generally by the numerals 73. The ground floor stores open directly onto the sidewalk, designated generally by the numeral 74.

The theatre entrance is indicated generally at 80, a plurality of outer doors 81 and inner doors 82 being so disposed as to form an outer lobby opening onto the sidewalk, the outer entrance being protected by a canopy 83 of any suitable construction. In the lobby 80 are provided ticket booths or offices 84 at either side thereof, one or more of which opens into a private office 85 opening into the grand lobby 86. Where desired, one of the ticket offices may be used as a private office. The main lobby is generally circular in shape in order to afford a maximum of space available for the public with a minimum of building space required. Leading off from the main lobby and entirely surrounding the auditorium is the grand corridor 87, which is provided with a series or plurality of alcoves 88 of various sizes which are adapted to serve as hold-out areas in which waiting crowds can be held in the theatre and in close proximity to the seats so that they can proceed to them immediately they are vacated without having to rush from the main lobby. It is to be noted that the main lobby is of such a size that it will hold a waiting crowd equal in number to half the seating capacity of the theatre. The exits 89 may be provided at the rear of the grand corridor substantially diametrically opposite the center of the grand lobby to permit direct egress to the street via passageway 90.

Admission to the main body of the auditorium is permitted by stairways 33 located at suitable points along the grand corridor. From the corridor at opposite sides of the auditorium, staircases 91 permit access to the lounge 92, situated under the auditorium, through passageways 93. Opening off the lounge are a cosmetic room 94 and a smoking room 95, leading respectively into the women's lavatory 96, and men's lavatory 97. On the opposite side of the lounge from the lavatories is located a room 98, for the ushers. These various rooms may be provided with the usual partitions 99 of any suitable material and construction.

The several rooms will be provided with the usual doorways, the details of which form no part of the present invention and will be described no further.

With respect to Fig. 5 it is to be noted that the vertical supports 60 are substantially uniformly distributed over the entire area of the basement, providing uniform support for the entire superstructure, and that this superstructure support is substantially vertically continuous, being subjected to but a slight interruption in the space occupied by the seating portion of the auditorium. Due to the construction of the latter an ample substitute for the interrupted supports is provided, permitting the adequate support of any superstructure. The space 100 in the basement of the building not occupied by the lounge and appurtenant rooms, may be used for storage purposes or for housing heating and cooling apparatus and service quarters for the building, as well as for a basement projection room, as noted hereinabove.

While the projection system herein disclosed is particularly adapted for use with translucent screens, it will, of course, be appreciated that direct projection from machines positioned in the rear of the several sections of the auditorium may be employed without departing from the spirit and scope of the invention. In addition, the projection may take place by positioning mirrors at the rear of the auditorium, or in the ceiling thereof, and so arranging them that a beam cast from the projection chamber between the screens will hit the side of the mirrors and be reflected thence onto the screen.

It will now be appreciated that there has been provided an improved building construction particularly adapted for motion picture theatres, and more particularly for sound and visual projection, in which all parts of the auditorium are within easy aural and visual distances from the viewing surfaces or screens, and which provides a plurality of screens, each centrally disposed with respect to the auditorium and each of which is adapted to serve a particular portion of the auditorium. The several screens may be served by a unitary projection apparatus, or each may be provided with its own such apparatus, and the screens are preferably of the translucent type, in which the pictures are projected from the rear on the screen, thus doing away with beams of light traversing the auditorium above the heads of the people. In addition the novel screen structure permits the substitution of opaque silver curtains before the viewing screen, whereby the auditorium may be illuminated by means of reflected light, the curtains acting as gigantic reflectors, and thus doing away with the necessity for having a separate lighting system for the auditorium.

The illumination of the auditorium is preferably carried out according to the principles of the present invention by providing reflecting silver curtains 202, in front of the screens when the latter are not in use. These curtains may be illuminated laterally, by means of lights 204 disposed along the edges of the screen apertures, thus providing an evenly diffused light for the auditorium when the latter is not in use for picture projection. In addition, the use of such reflecting curtains or screens provides for the illumination of various sections of the auditorium, while at the same time permitting the use of the other sections for picture purposes. The lights 204, may be provided with reflectors 205, if desired, to direct the light onto the screens. Spot lights 206 suitably positioned in various parts of the auditorium may be used to furnish illumination and can be desirably projected onto the reflecting screen to provide illumination for the auditorium. In addition, ceiling lights 207, in any desired number and arrangement, may be provided for general illuminating purposes. The improved motion picture theatre is adapted for incorporation in various types of building constructions without requiring special supports for any desired superstructure.

While the above described novel arrangement of viewing screens is particularly adapted for incorporation in permanent buildings, as will be described more in detail hereinafter, the invention comprehends the utilization of such a system for the presentation of outdoor shows and the like. Thus, for example, a motor van or a temporary platform, may be utilized as the projection room and the viewing screens superimposed thereon in such a manner as to be visible from all seats. In the presentation of such outdoor shows the viewing screens and associated projection room may be installed in the center of a park or open space and the audience grouped therearound.

It will be understood that the invention is capable of various modifications and changes, but such modifications and changes are to be considered as being within the scope of this invention, as outlined in the following claims:

What I claim is:

1. In a motion picture theatre, in combination, an auditorium having rows of seats concentrically arranged therein, said rows of seats being divided into a plurality of seating sections; a multi-screen projection assembly disposed in the center of said auditorium, each of said seating sections being provided with a corresponding viewing screen; means comprising supporting columns disposed between the said viewing screens to act as building supports and separating members, said columns being provided with outwardly flared divergent fins serving to separate the several screen sections; illuminating means disposed within the fins and adapted to illuminate the spaces intermediate the several seating sections; ventilating means formed in the said fins, and further ventilating means distributed over the seating sections and adapted to coact with the first said ventilating means.

2. In a motion picture theatre, in combination, an auditorium, a centrally disposed projection room having a plurality of viewing screens disposed therearound; a plurality of concentric rows of seats disposed around said screens and filling said auditorium; a plurality of concentric aisles paralleling said seats and other said aisles transverse to said first-named aisles, said transverse aisles extending from the respective corners of the viewing screens to the outside of the auditorium; a grand corridor subjacent to said auditorium and serving the same; a plurality of hold-out areas disposed in the periphery of said grand corridor; a main lobby of generally circular configuration formed at one side of said grand corridor, and a plurality of entrances opening onto said main lobby.

3. In theatre construction, in combination, an auditorium having rows of seats concentrically arranged therein, said rows of seats being divided into a plurality of seating sections, a multi-stage arrangement disposed centrally of the auditorium, each of said seating sections facing one of said stages, supporting columns disposed between the stages to act as building supports and separating members, said columns being provided with outwardly flared divergent fins serving to separate the several stage sections, illuminating means disposed within the fins and adapted to illuminate the spaces intermediate the several seating sections.

4. In theatre construction, in combination, an auditorium having rows of seats concentrically arranged therein, said rows of seats being divided into a plurality of seating sections, a multi-stage arrangement disposed centrally of the auditorium, each of said seating sections facing one of said stages, supporting columns disposed between the stages to act as building supports and separating members, said columns being provided with outwardly flared divergent fins serving to separate the several stage sections, and ventilating means formed in said fins.

5. In theatre construction, in combination, an auditorium having rows of seats concentrically arranged therein, said rows of seats being divided into a plurality of seating sections, a multi-stage arrangement disposed centrally of the auditorium, each of said seating sections facing one of said stages, supporting columns disposed between the stages to act as building supports and separating members, said columns being provided with outwardly flared divergent fins serving to separate the several stage sections, ventilating means formed in said fins, and further ventilating means distributed over the seating sections and adapted to coact with the first ventilating means.

6. In a motion picture theatre, in combination, an auditorium having rows of seats concentrically arranged therein, said rows of seats being divided into a plurality of seating sections, a multi-screen projecting assembly disposed in the center of said auditorium, each of said seating sections being provided with a corresponding viewing screen, means comprising supporting columns disposed between the said viewing screens to act as building supports and separating members, said columns being provided with outwarly flared divergent fins serving to separate the several screen sections, separate reflecting screens associated with the viewing screens and adapted to be movably placed thereover, and like means adapted to illuminate said reflecting screens.

7. In a motion picture theatre, in combination, an auditorium having rows of seats concentrically arranged therein, said rows of seats being divided into a plurality of seating sections; a multi-screen projecting assembly disposed in the center of said auditorium, each of said seating sections being provided with a corresponding viewing screen, means comprising supporting columns disposed between the said viewing screens to act as building supports and separating members, said columns being provided with outwardly flared divergent fins serving to separate the several screen sections, reflecting screens exteriorally disposable with respect to the viewing screens and adapted to be illuminated whereby to illuminate the auditorium.

HENRY H. DREYFUSS.